(12) United States Patent
Mizutani

(10) Patent No.: US 8,416,288 B2
(45) Date of Patent: Apr. 9, 2013

(54) ELECTRONIC APPARATUS AND IMAGE PROCESSING METHOD

(75) Inventor: Fumitoshi Mizutani, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 191 days.

(21) Appl. No.: 13/079,687

(22) Filed: Apr. 4, 2011

(65) Prior Publication Data

US 2012/0013718 A1 Jan. 19, 2012

(30) Foreign Application Priority Data

Jul. 15, 2010 (JP) ................. 2010-160976

(51) Int. Cl.
*H04N 13/04* (2006.01)
*H04N 9/47* (2006.01)

(52) U.S. Cl.
USPC .................. 348/54; 348/42; 352/86

(58) Field of Classification Search .......... 348/42, 348/54; 352/86
See application file for complete search history.

(56) References Cited

U.S. PATENT DOCUMENTS

| 2010/0074594 A1 | 3/2010 | Nakamura et al. |
| 2011/0141236 A1 | 6/2011 | Mitani et al. |
| 2011/0157310 A1 | 6/2011 | Mitani et al. |

FOREIGN PATENT DOCUMENTS

| JP | 10-327430 | | 12/1998 |
| JP | 11-289555 | A | 10/1999 |
| JP | 2000-078611 | A | 3/2000 |
| JP | 2000-261828 | A | 9/2000 |
| JP | 2004-274125 | A | 9/2004 |
| JP | 2006-325165 | A | 11/2006 |
| JP | 2010-088092 | A | 4/2010 |
| WO | WO 2010/032399 | A1 | 3/2010 |

OTHER PUBLICATIONS

Notice of Reasons for Rejection mailed by Japan Patent Office on Aug. 9, 2011 in the corresponding Japanese patent application No. 2010-160976.
Notice of Reasons for Rejection mailed by Japan Patent Office on Jan. 10, 2012 in the corresponding Japanese patent application No. 2010-160976.

*Primary Examiner* — Mehrdad Dastouri
*Assistant Examiner* — Kristin Dobbs
(74) *Attorney, Agent, or Firm* — Knobbe, Martens, Olson & Bear LLP

(57) ABSTRACT

According to one embodiment, an electronic apparatus configured to reproduce video data and additional data for displaying a sub-image, includes a first generator, an arrangement control module, a second generator, and a display control module. The first generator estimates depths of pixels in an image frame of the video data, and generates first left-eye image data and first right-eye image data which correspond to the image frame and have a parallax based on the depths. The arrangement control module sets a depth at which the sub-image is to be displayed, based on a foremost depth of the depths. The second generator generates second left-eye image data and second right-eye image data which correspond to the additional data and have a parallax based on the set depth of the sub-image. The display control module displays an image frame generated by using the generated image data.

9 Claims, 8 Drawing Sheets

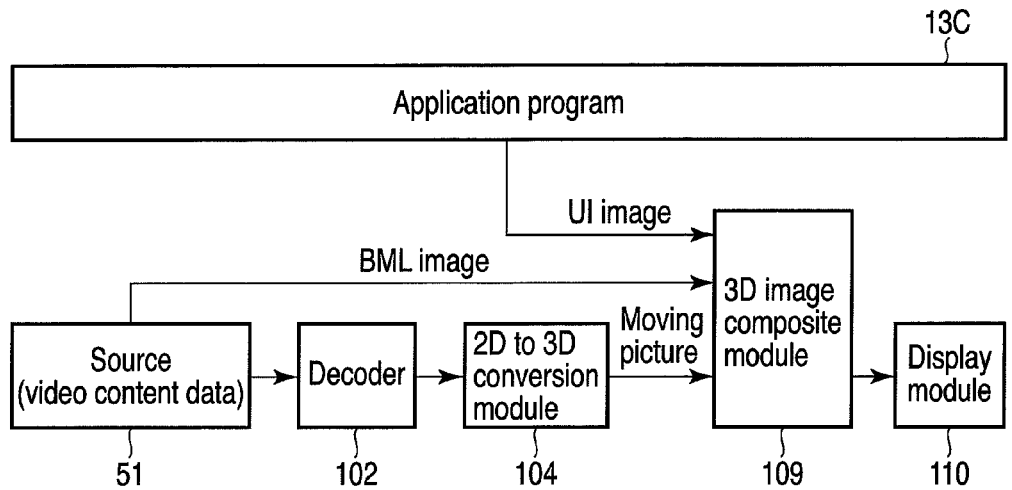
F I G. 3
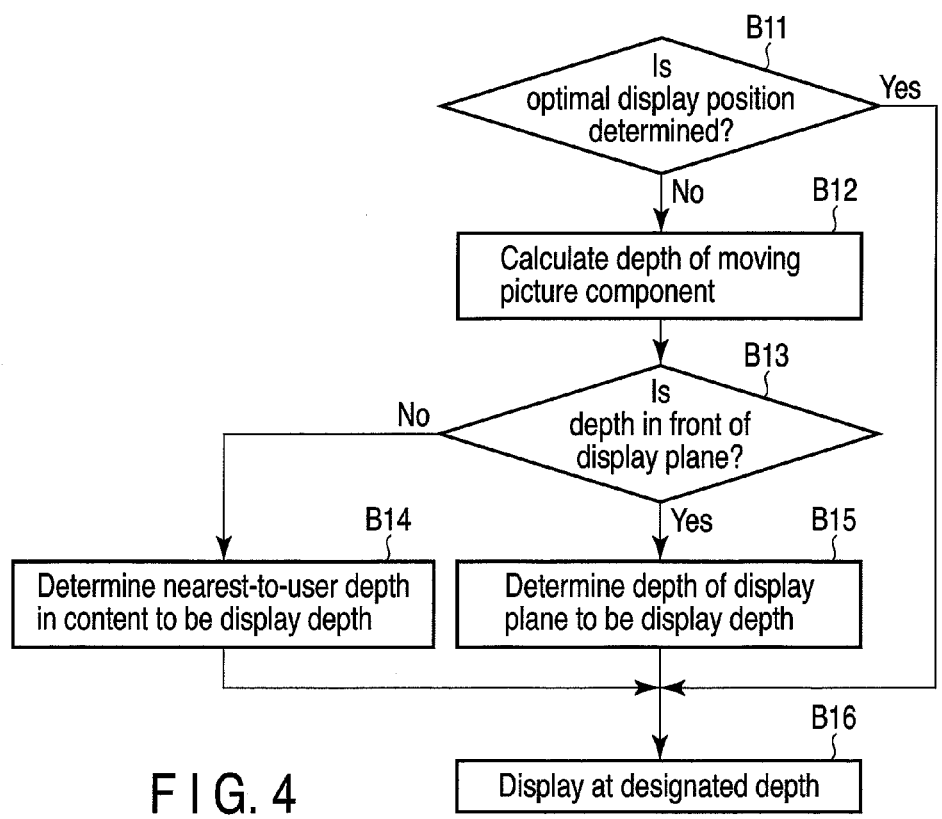
F I G. 4

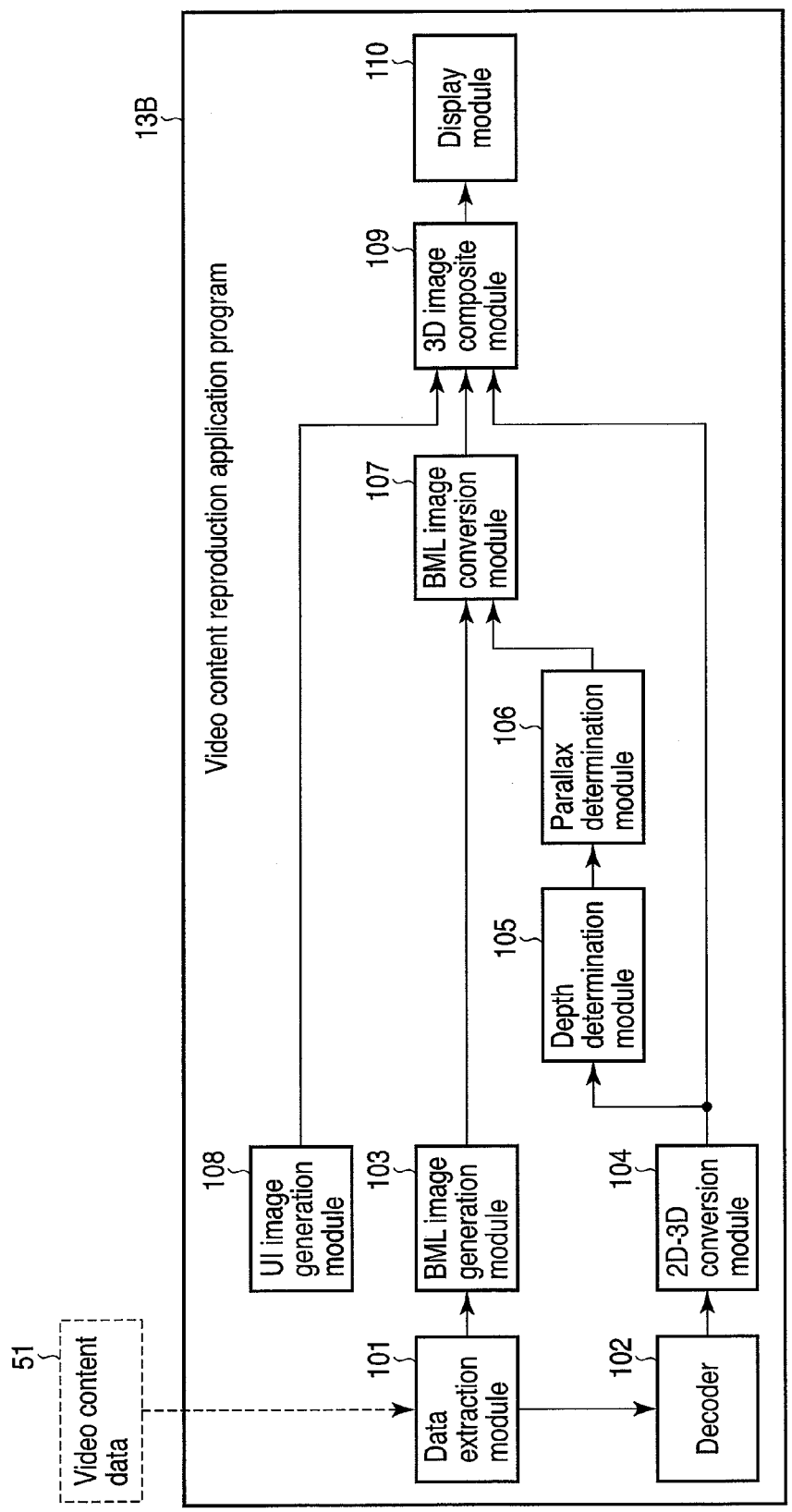
F I G. 5

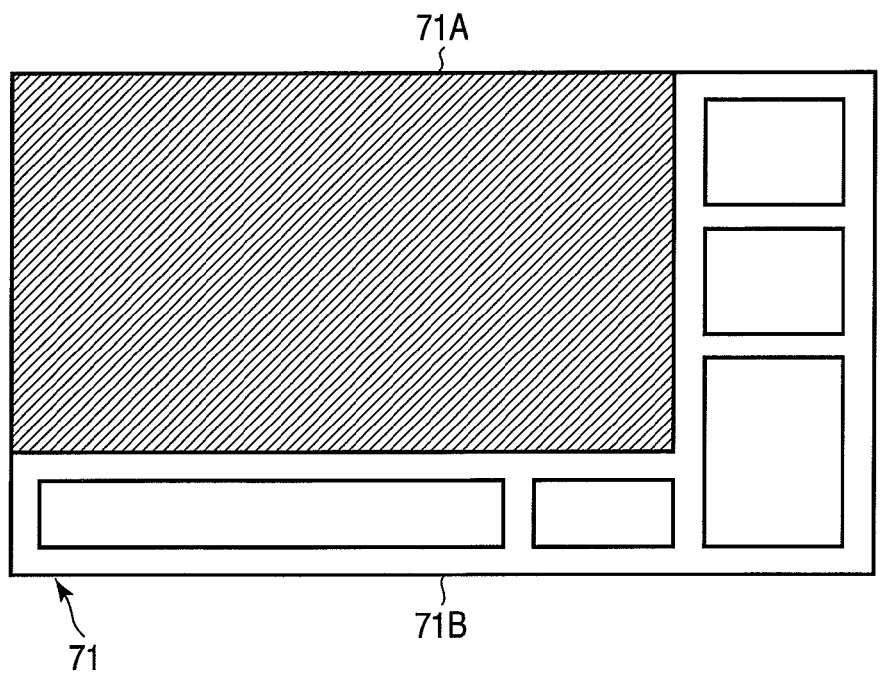
F I G. 6
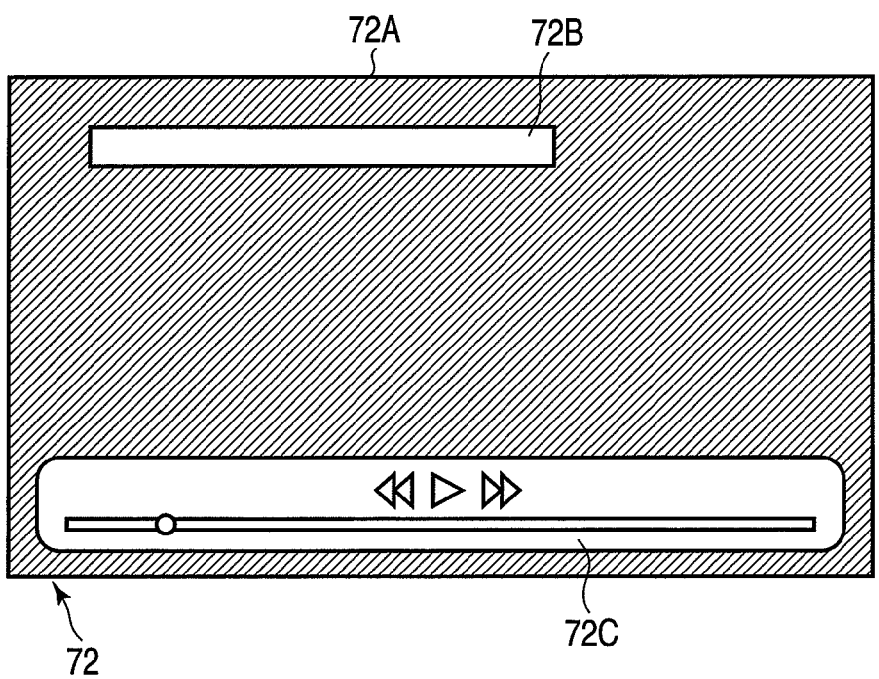
F I G. 7

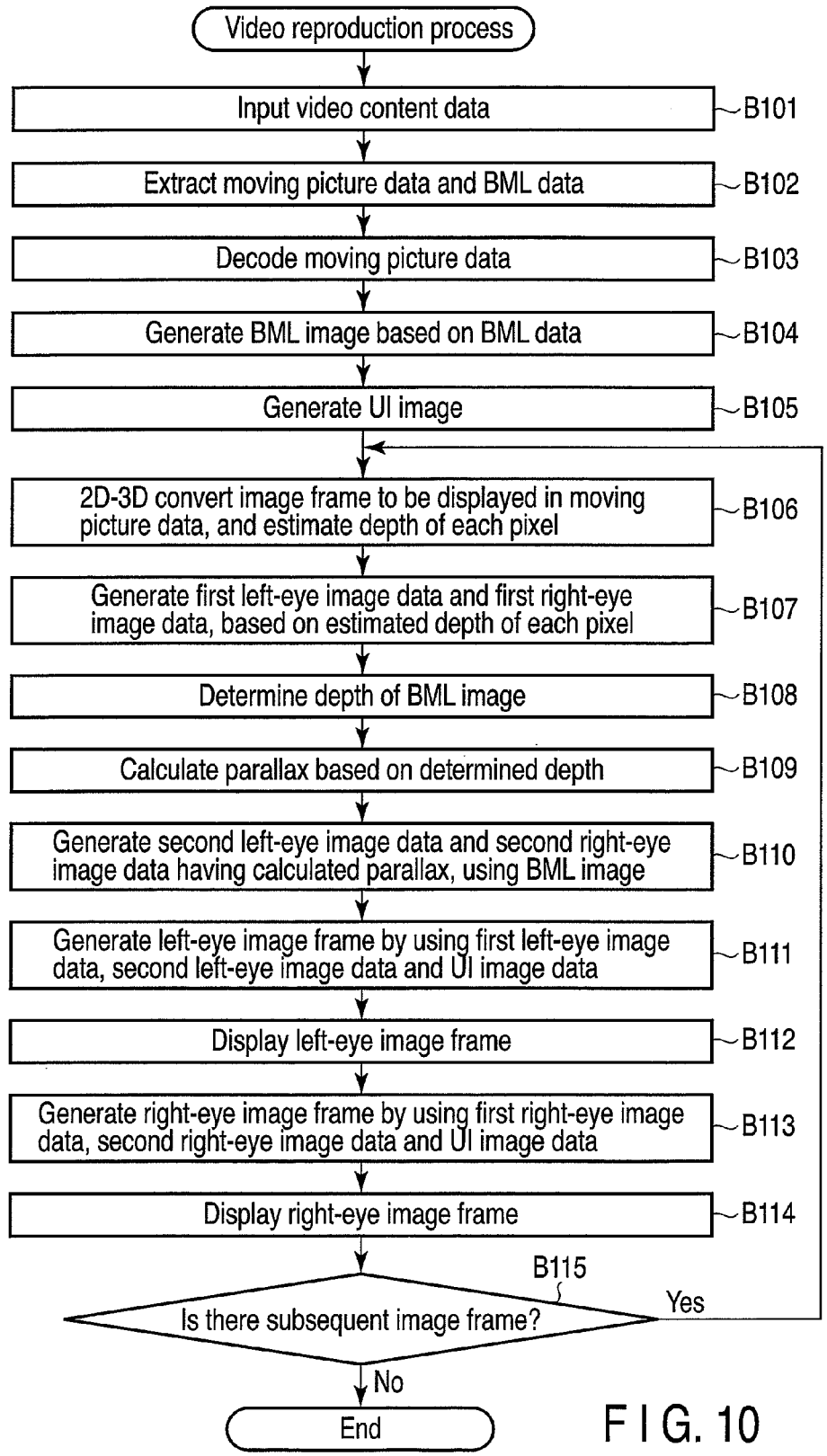
F I G. 10

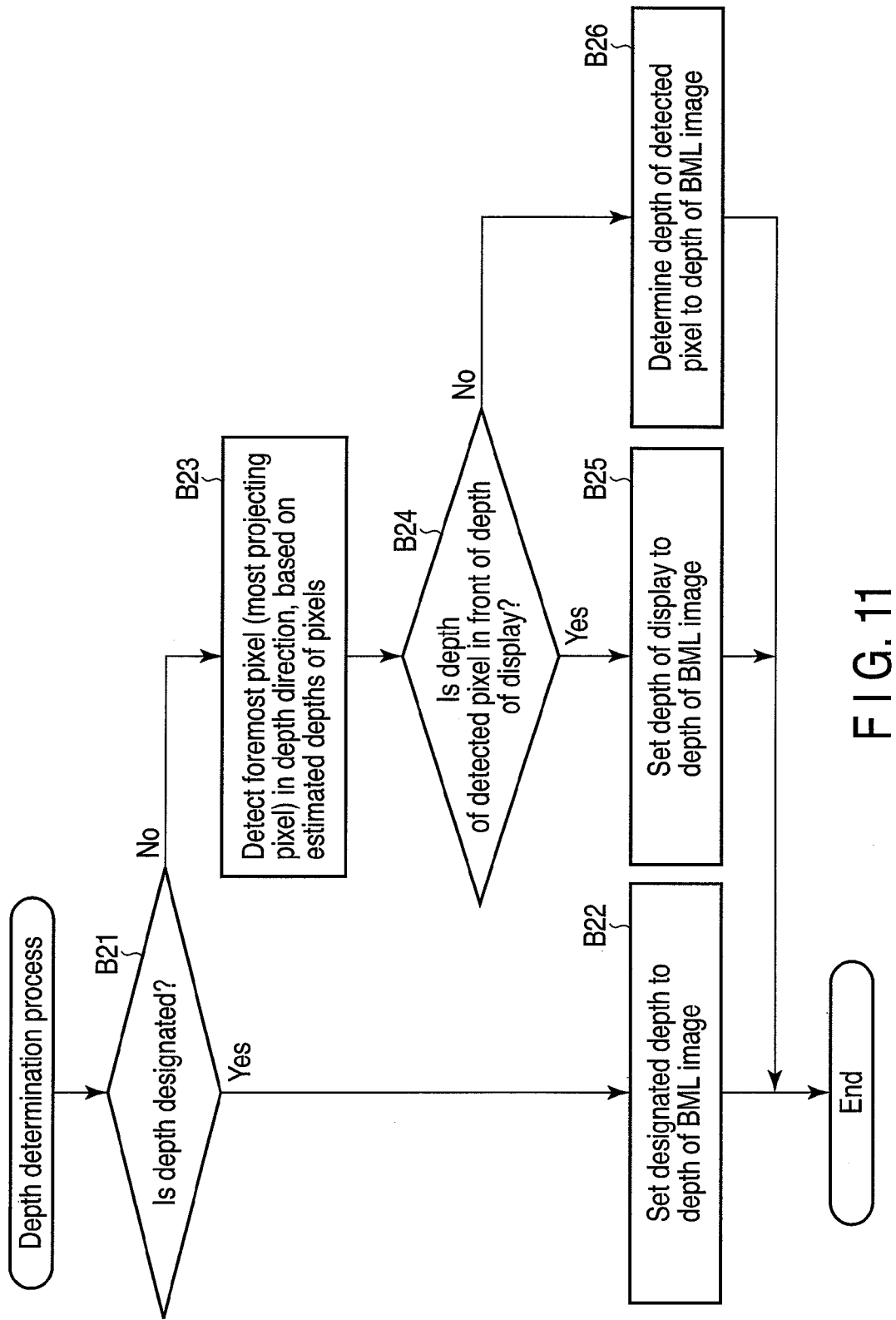
F I G. 11

US 8,416,288 B2

ELECTRONIC APPARATUS AND IMAGE PROCESSING METHOD

CROSS-REFERENCE TO RELATED APPLICATIONS

This application is based upon and claims the benefit of priority from Japanese Patent Application No. 2010-160976, filed Jul. 15, 2010; the entire contents of which are incorporated herein by reference.

FIELD

Embodiments described herein relate generally to an electronic apparatus which reproduces three-dimensional video content, and an image processing method which is applied to the electronic apparatus.

BACKGROUND

Conventionally, there are provided various video display apparatuses which enable viewing of three-dimensional (3D) video. In such video display apparatuses, for example, a user is enabled to perceive 3D video (stereoscopic video) by viewing left-eye video and right-eye video based on binocular parallax.

In general, most of video contents, which are received via broadcast or networks, are video content data including two-dimensional (2D) video. In order to view 3D video by using such video content data, various techniques are proposed for converting 2D video to 3D video.

However, like a data broadcast signal included in a terrestrial digital broadcast signal, video content data includes additional data, other than video data, for instance, data which is not suited to 3D visualization, such as a still image or text. Thus, even if a 3D visualization process is applied to a still image or text by using the technique for converting 2D video to 3D video, it is difficult to impart a proper stereoscopic effect to the still image or text. Consequently, when 3D video, which is generated by applying the 3D visualization process to video data and additional data (still image or text), is displayed, a user may feel, for example, unnatural such that a region where a still image or text is 3D-converted is embedded in a region where video is 3D-converted.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary conceptual diagram illustrating the flow of video content data reproduction by the electronic apparatus of the embodiment.

FIG. 4 is an exemplary flowchart illustrating an example of the procedure of a depth determination process which is executed by the electronic apparatus of the embodiment.

FIG. 5 is an exemplary block diagram illustrating the structure of a video reproduction application program which is executed by the electronic apparatus of the embodiment.

FIG. 6 illustrates an example of a screen which is displayed by the video reproduction application program which is executed by the electronic apparatus of the embodiment.

FIG. 7 illustrates another example of the screen which is displayed by the video reproduction application program which is executed by the electronic apparatus of the embodiment.

FIG. 10 is an exemplary flowchart illustrating an example of the procedure of a video reproduction process which is executed by the electronic apparatus of the embodiment.

FIG. 11 is an exemplary flowchart illustrating another example of the procedure of the depth determination process which is executed by the electronic apparatus of the embodiment.

DETAILED DESCRIPTION

Various embodiments will be described hereinafter with reference to the accompanying drawings.

In general, according to one embodiment, an electronic apparatus configured to reproduce content data including video data and additional data for displaying a sub-image, includes a first generator, an arrangement control module, a second generator and a display control module. The first generator estimates depths of pixels in an image frame of the video data by analyzing the image frame, and generates first left-eye image data and first right-eye image data which correspond to the image frame, the first left-eye image data and the first right-eye image data having a parallax based on the estimated depths of the pixels. The arrangement control module sets a depth at which the sub-image is to be displayed, based on a foremost depth of the depths of the pixels in the image frame. The second generator generates second left-eye image data and second right-eye image data which correspond to the additional data, the second left-eye image data and the second right-eye image data having a parallax based on the set depth of the sub-image. The display control module displays, on a screen of a display, an image frame which is generated by using the first left-eye image data, the first right-eye image data, the second left-eye image data, and the second right-eye image data.

Figure 1:
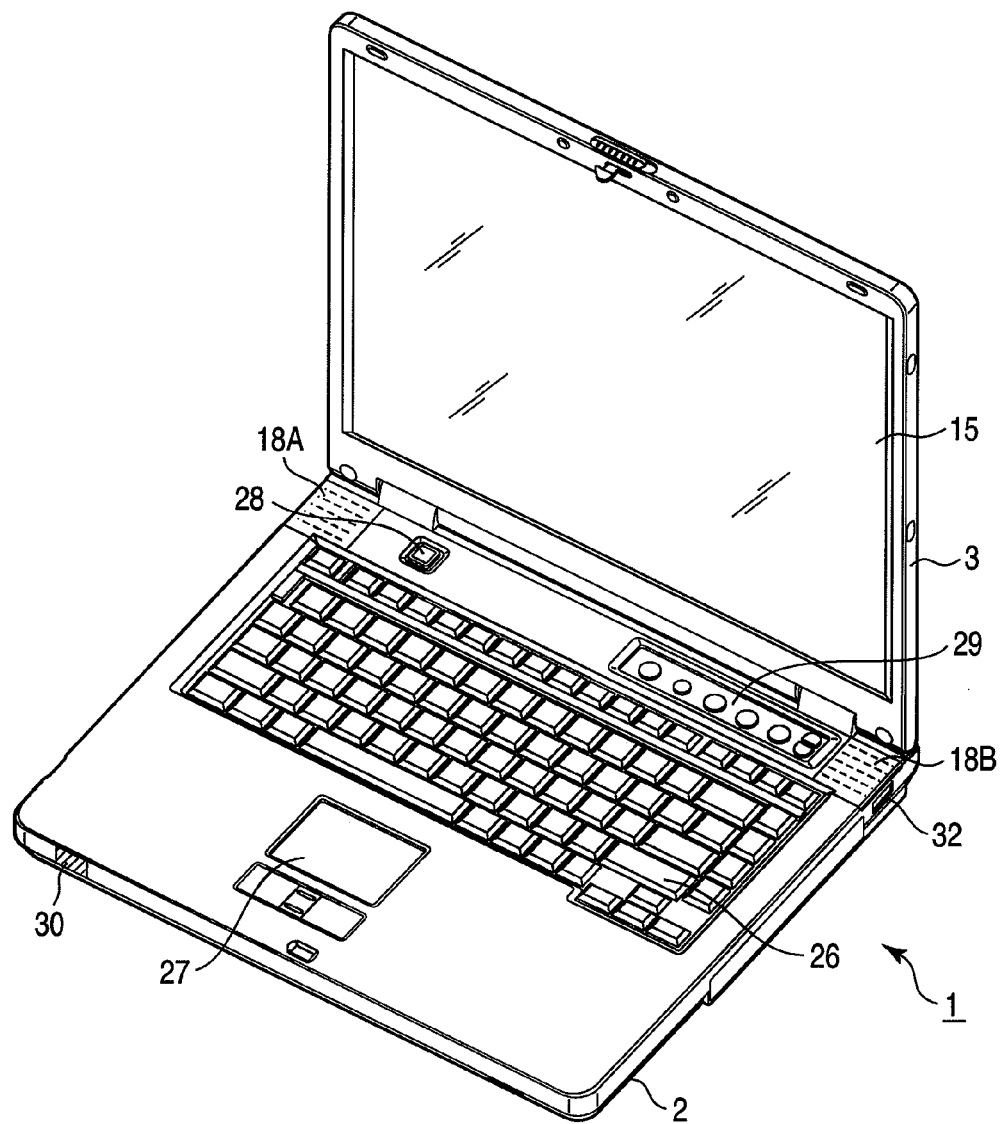
FIG. 1 is an exemplary perspective view illustrating the external appearance of an electronic apparatus according to an embodiment.

FIG. 1 is a perspective view showing the external appearance of an electronic apparatus according to an embodiment. The electronic apparatus is realized, for example, as a notebook-type personal computer 1. As shown in FIG. 1, the computer 1 includes a computer main body 2 and a display unit 3.

A liquid crystal display (LCD) 15 is built in the display unit 3. The display unit 3 is attached to the computer main body 2 such that the display unit 3 is rotatable between an open position where the top surface of the computer main body 2 is exposed, and a closed position where the top surface of the computer main body 2 is covered.

The computer main body 2 has a thin box-shaped housing. A keyboard 26, a power button 28 for powering on/off the computer 1, an input operation panel 29, a pointing device 27, and speakers 18A and 18B are disposed on the top surface of the housing of the computer main body 2. Various operation buttons are provided on the input operation panel 29. The buttons include operation buttons for controlling television (TV) functions (viewing, recording and reproduction of recorded broadcast program data/video data). A front surface of the computer main body 2 is provided with a remote-control unit interface module 30 for communicating with a remote-control unit which remote-controls the TV functions of the computer 1. The remote-control unit interface module 30 is composed of, for example, an infrared signal reception module.

An antenna terminal 32 for TV broadcast is provided, for example, on a right-side surface of the computer main body 2. In addition, an external display connection terminal supporting, e.g. the high-definition multimedia interface (HDMI) standard is provided, for example, on a rear surface of the computer main body 2. This external display connection terminal is used for outputting video data (moving picture data) included in video content data, such as broadcast program data, to an external display.

Figure 2:
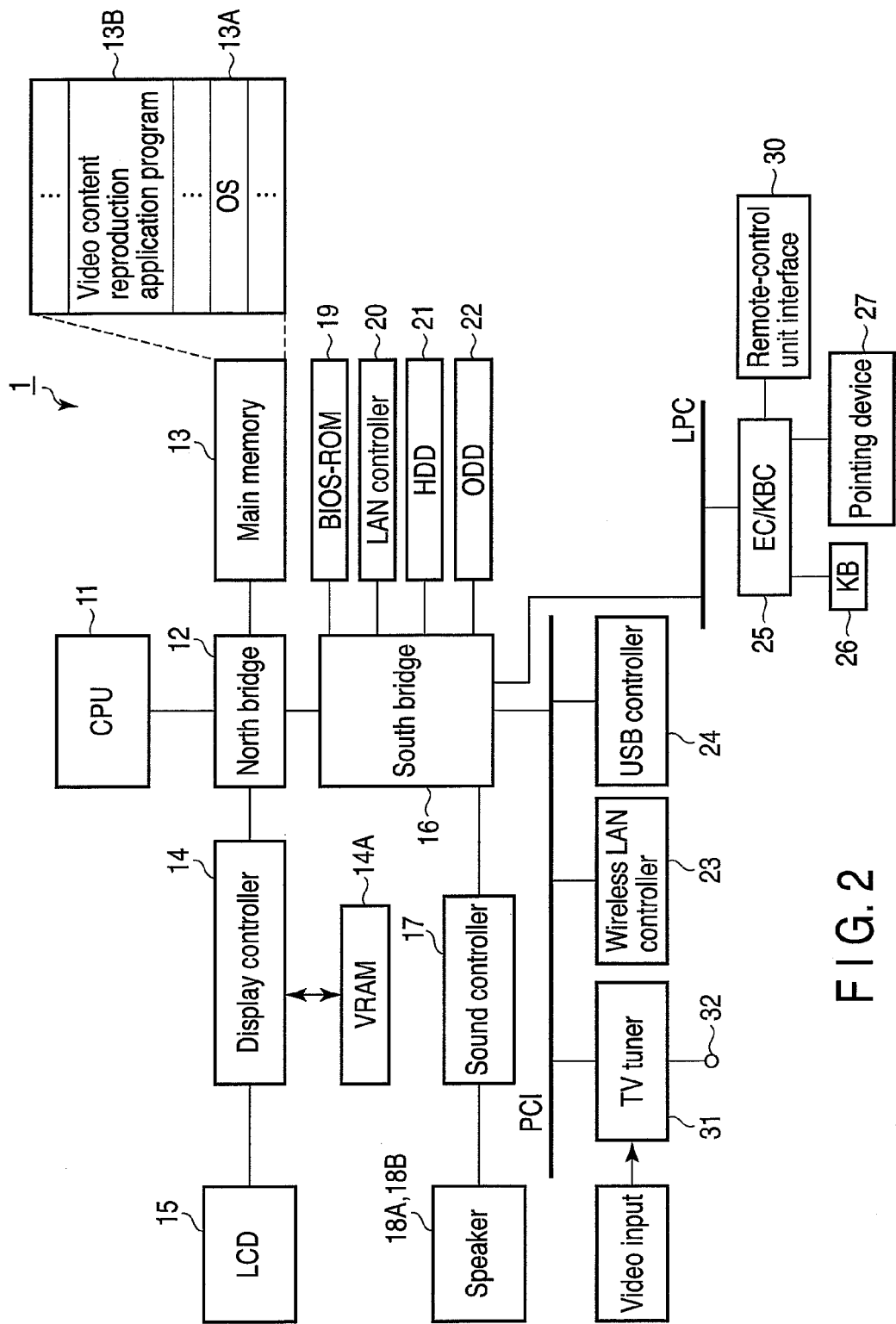
FIG. 2 is an exemplary block diagram illustrating the system configuration of the electronic apparatus of the embodiment.

FIG. 2 shows the system configuration of the computer 1.

The computer 1, as shown in FIG. 2, includes a CPU 11, a north bridge 12, a main memory 13, a display controller 14, a video memory (VRAM) 14A, LCD 15, a south bridge 16, a sound controller 17, speakers 18A and 18B, a BIOS-ROM 19, a LAN controller 20, a hard disk drive (HDD) 21, an optical disc drive (ODD) 22, a wireless LAN controller 23, a USB controller 24, an embedded controller/keyboard controller (EC/KBC) 25, a keyboard (KB) 26, a pointing device 27, a remote-control unit interface module 30, and a TV tuner 31.

The CPU 11 is a processor for controlling the operations of the respective components in the computer 1. The CPU 11 executes an operating system (OS) 13A and application programs, such as a video content reproduction application program 13B, which are loaded from the HDD 21 into the main memory 13. The video content reproduction application program 13B is software having a function for viewing video content data. The video content reproduction application program 13B executes a live reproduction process for viewing broadcast program data which is received by the TV tuner 31, a recording process for recording the received broadcast program data in the HDD 21, a reproduction process for reproducing broadcast program data/video data which is recorded in the HDD 21, and a reproduction process for reproducing video content data which is received via a network. Further, the video content reproduction application program 13B includes a function for viewing 3D video. The video content reproduction application program 13B converts 2D video, which is included in video content data, to 3D video in real time, and then displays the 3D video on the screen of the LCD 15.

For the display of 3D video, use may be made of, for example, a shutter method (also referred to as "time-division method"). In the 3D video display by the shutter method, a stereo-pair video including left-eye video data and right-eye video data is used. The LCD 15 is driven by a refresh rate (e.g. 120 Hz) which is twice the normal refresh rate (e.g. 60 Hz). The left-eye frame data in the left-eye video data and the right-eye frame data in the right-eye video data are alternately displayed on the LCD 15 with a refresh rate of, e.g. 120 Hz. For example, by using 3D glasses (not shown) such as liquid crystal shutter glasses, the user can view the image corresponding to the left-eye frame by the left eye and the image corresponding to the right-eye frame by the right eye. The 3D glasses may be configured to receive a synchronization signal, which indicates a display timing of the left-eye frame data and right-eye frame data, from the computer 1 by using, e.g. infrared. The left-eye shutter and right-eye shutter in the 3D glasses are opened/closed in synchronization with the display timing of the left-eye frame data and right-eye frame data on the LCD 15.

Alternatively, for the display of 3D video, use may be made of a polarization method such as an Xpol (trademark) method. In this case, for example, interleaved frames, in which a left-eye image and a right-eye image are interleaved in units of a scanning line, are generated, and the interleaved frames are displayed on the LCD 15. A polarizing filter covering the screen of the LCD 15 polarizes the left-eye image, which is displayed, for example, in odd-numbered lines on the screen of the LCD 15, and the right-eye image, which is displayed in even-numbered lines on the screen of the LCD 15, in different directions. By using polarizing glasses, the user sees the left-eye image only by the left eye and sees the right-eye image only by the right eye.

Besides, the CPU 11 executes a basic input/output system (BIOS) that is stored in the BIOS-ROM 19. The BIOS is a program for hardware control.

The north bridge 12 is a bridge device which connects a local bus of the CPU 11 and the south bridge 16. The north bridge 12 includes a memory controller which access-controls the main memory 13. The north bridge 12 also has a function of communicating with the display controller 14.

The display controller 14 is a device which controls the LCD 15 that is used as a display of the computer 1. A display signal, which is generated by the display controller 14, is sent to the LCD 15. The LCD 15 displays video, based on the display signal.

The south bridge 16 controls devices on a peripheral component interconnect (PCI) bus and devices on a low pin count (LPC) bus. The south bridge 16 includes an integrated drive electronics (IDE) controller for controlling the HDD 21 and ODD 22, and a memory controller which access-controls the BIOS-ROM 19. The south bridge 16 also has a function of communicating with the sound controller 17 and LAN controller 20.

The sound controller 17 is a sound source device and outputs audio data, which is a target of reproduction, to the speakers 18A and 18B. The LAN controller 20 is a wired communication device which executes wired communication of, e.g. the Ethernet (trademark) standard. The wireless LAN controller 23 is a wireless communication device which executes wireless communication of, e.g. the IEEE 802.11 standard. In addition, the USB controller 24 communicates with an external device via a cable of, e.g. the USB 2.0 standard.

The EC/KBC 25 is a one-chip microcomputer in which an embedded controller for power management and a keyboard controller for controlling the keyboard (KB) 26 and pointing device 27 are integrated. The EC/KBC 25 has a function of powering on/off the computer 1 in accordance with the user's operation. Further, the EC/KBC 25 has a function of communicating with the remote-control unit interface module 30.

The TV tuner 31 is a reception device which receives broadcast program data that is broadcast by a television (TV) broadcast signal. The TV tuner 31 is connected to the antenna terminal 32. The TV tuner 31 is realized as a digital TV tuner which can receive a digital broadcast program data of, e.g. terrestrial digital TV broadcast. In addition, the TV tuner 31 has a function of capturing video data which is input from an external device.

Next, referring to FIG. 3, a description is given of a video content reproduction function of the embodiment. Source data (video content data) that is a target of reproduction includes, for example, video data for displaying video (moving picture) and additional data for displaying a sub-image. The additional data includes, for example, BML data which is described by using a broadcast markup language (BML). Further, this additional data includes, for example, data relating to an image for accepting a manipulation input by the user. Specifically, by designating an object (e.g. a button, text indicative of a link, etc.) included in a sub-image generated based on the additional data, the user can perform a manipulation input to request a process corresponding to the object.

The video data in the source data 51 is output to a decoder 102. This video data is, in general, encoded (compressed and encoded). The decoder 102 decodes the encoded video data. Then, the decoder 102 outputs the decoded video data to a 2D to 3D conversion module 104.

The 2D to 3D conversion module 104 estimates depths (depth positions) of pixels included in image frames in the video data by analyzing each of the image frames using the decoded video data. The 2D to 3D conversion module 104 converts the video data to 3D video data using the estimated depths of pixels. The 3D video data includes, for example, first left-eye image data and first right-eye image data with a parallax based on the depths of pixels in the image frame. The 2D to 3D conversion module 104 outputs the 3D video data to a 3D image composite module 109.

The BML data (additional data) in the source data 51 designates a still image, text, etc., which are to be displayed. The BML data also designates the arrangement, size, etc. of the still image, text, etc. Accordingly, a sub-image, which is displayed on the screen of the LCD 15, is generated based on the BML data. In the meantime, the position in the depth direction, at which the sub-image is to be displayed, is determined (set) based on the depths of the pixels in the image frame, which are estimated by the 2D to 3D conversion module 104. To be more specific, the depth, at which the sub-image is to be displayed, is determined based on a foremost foreground depth of all depths of the pixels in the image frame. Then, second left-eye image data and second right-eye image data corresponding to the BML data, which have a parallax based on the determined depth of the sub-image, are generated. The generated second left-eye image data and second right-eye image data are output to the 3D image composite module 109. In the description below, an image which is generated based on the BML data is also referred to as "BML image". A process relating to the determination of the depth, at which the sub-image is to be displayed, will be described later with reference to FIG. 4.

An application program 13C generates user interface image data (UI image data), such as a menu, for manipulating the video content data 51 (video and sub-image displayed on the screen). The application program 13C outputs the generated UI image data to the 3D image composite module 109.

The 3D image composite module 109 composites the UI image, sub-image and 3D video. Specifically, the 3D image composite module 109 generates a left-eye image frame by using the first left-eye image data, second left-eye image data and UI image data. The 3D image composite module 109 also generates a right-eye image frame by using the first right-eye image data, second right-eye image data and UI image data. The above-described respective image data may be generated as image layers. The 3D image composite module 109 generates image frames by superimposing these image layers by, e.g. alpha-blending. Then, the 3D image composite module 109 outputs the generated left-eye and right-eye image frames to a display module 110.

The display module 110 alternately displays, on the screen (LCD 15), the left-eye image frame and right-eye image frame output by the 3D image composite module 109. The user can perceive a 3D image, for example, by viewing the screen with use of liquid crystal shutter glasses, as described above. In addition, the display module 110 may display on the screen an interleaved image in which the left-eye image frame and right-eye image frame are interleaved in units of a scanning line. In this case, the user can perceive a 3D image by viewing the screen with use of, e.g. polarizing glasses.

A flowchart shown in FIG. 4 illustrates the procedure of a process for determining a position in a depth direction at which a sub-image is to be displayed.

To start with, it is determined whether an optimal position (optimal depth) in the depth direction, at which a sub-image is to be displayed, is determined or not (block B11). If the optimal display position is determined (YES in block B11), the sub-image is displayed at the determined optimal display position. If the optimal display position is determined, the position in the depth direction at which the sub-image is to be displayed is, for example, preset by the user.

If the optimal display position is not determined (NO in block B11), the depths of pixels in a video data component (moving picture component) is calculated (block B12). The depths of the pixels in the image frame, which is estimated by the above-described 2D to 3D conversion module 104, may be used for the depths of the pixels in the video data component.

Then, it is determined whether the depth of the moving picture component is in front of the display plane (the screen of LCD 15) (block B13). For example, it is determined whether there is a pixel whose depth is in front of the display plane among the pixels in the image frame. If the depth of the moving picture component is not in front of the display plane (NO in block B13), the position corresponding to a foremost foreground pixel (the position nearest to the user in the video content (moving picture component)) is determined to be the position in the depth direction at which the sub-image is to be displayed, based on the depth of the pixels in the image frame (block B14).

If the depth of the moving picture component is in front of the display plane (YES in block B13), the display plane (a depth of the display plane) is determined to be the position in the depth direction at which the sub-image is to be displayed (block B15). Then, the sub-image is displayed at the position determined in block B14 or block b15 (block B16).

By the above-described process, the position in the depth direction at which the sub-image is to be displayed is determined. Subsequently, the parallax corresponding to the determined display position in the depth direction is calculated. Then, second left-eye image data and second right-eye image data, which have the calculated parallax, are generated with use of the BML data. The second left-eye image data and second right-eye image data are output to the 3D image composite module 109.

FIG. 5 illustrates a structure example of the video content reproduction application program 13B of the embodiment. The video content reproduction application program 13B has a function of reproducing video content data 51. The video content data 51 includes, for example, video data and BML data. The video data is data for displaying video (2D video). The BML data is data for displaying an image (hereinafter referred to as "BML image") including a still image, text, etc. relating to the video data. The BML data is described by using BML. The details of the structure of the video content reproduction application program 13B will be described after the descriptions of FIG. 6 and FIG. 7.

FIG. 6 shows an example of a screen on which video and a BML image are displayed. A screen 71 shown in FIG. 6 includes a region 71A where video is displayed, and a region 71B where a BML image is displayed.

The region 71B may display, as BML images, a still image, a moving picture, character information, a button (image) for manipulating the video 71A. The BML images displayed on the region 71B may images on which a selection operation can be performed. Specifically, when a manipulation input is executed on the BML image from the pointing device 27 such as a mouse, the computer 1 executes a process corresponding to the manipulated image, and displays a screen based on the process on the LCD 15.

On the screen 71, the region 71B of BML images is displayed on both the right (lateral) side and lower side of the region 71A on which the video is displayed. However, the display position of the region 71B is not limited to this example. For example, the region 71B may be displayed only on the lower side of the region 71A, or only on the lateral side of the region 71A.

In the 3D video which is generated by applying a 3D visualization process to the video region 71A and BML image region 71B, as displayed on the screen 71, by using the technique for converting 2D video to 3D video, a user may feel unnaturalness such that a region where a BML image is 3D-converted is embedded in a region where video is 3D-converted. In addition, when the depth corresponding to a cursor indicating a manipulation position of the pointing device 27, such as a mouse, is different from the depth at which the BML image is displayed, it may possibly be difficult to point a target of manipulation such as a button on the BML image by moving the cursor. In other words, since the depth corresponding to the plane at which the mouse cursor is displayed is different from the depth corresponding to the plane at which the BML image is displayed, it is possible that the user cannot intuitively manipulate the pointing device 27.

FIG. 7 shows an example of a screen on which video and a user interface image are displayed. A screen 72 shown in FIG. 7 includes a region 72A on which video is displayed, a region 72B on which a menu for controlling playback of video is displayed, and a region 72C on which information relating to video is displayed. The same as in the case where the 3D visualization process has been applied to the screen 71 applies to the case where the 3D visualization process has been applied to the screen 72.

The content reproduction application 13B of the embodiment separately processes video and a sub-image so that the user perceives the video and sub-image (e.g. BML image or UI image) as proper 3D images. Specifically, the content reproduction application 13B does not apply the 3D visualization process to the image including the image frame and sub-image in the video, but individually applies the 3D visualization process to the image frame and sub-image in the video. Accordingly, the content reproduction application 13B generates the first left-eye image data and first right-eye image data corresponding to the image frame in the video and the second left-eye image data and second right-eye image data corresponding to the sub-image. Specifically, using the technique for converting 2D video to 3D video, the content reproduction application 13B applies the 3D visualization process to the video data, that is, generates the first left-eye image data and first right-eye image data corresponding to the image frame in the video. In addition, using the depth of the pixels in the image frame, which has been estimated when the video data was 3D-converted, the content reproduction application 13B determines the position in the depth direction at which the sub-image is to be displayed. The content reproduction application 13B then generates the second left-eye image data and second right-eye image data corresponding to the sub-image using the determined position in the depth direction.

Referring back to FIG. 5, the details of the structure of the video content reproduction application 13B are described. The video content reproduction application 13B includes a data extraction module 101, a decoder 102, a BML image generation module 103, a 2D-3D conversion module 104, a depth determination module 105, a parallax determination module 106, a BML image conversion module 107, a UI image generation module 108, a 3D image composite module 109, and a display module 110.

The data extraction module 101 extracts video data and BML data from input video content data 51. The data extraction module 101 outputs the extracted video data to the decoder 102. In addition, the data extraction module 101 outputs the extracted BML data to the BML image generation module 103.

The BML image generation module 103 generates BML image data, based on the BML data which has been output by the data extraction module 101. The BML data, as described above, is the data for displaying an image including a still image, text, etc. relating to the video data. The BML image generation module 103 generates, for example, BML image data including a still image, text, etc., which are arranged at designated positions with designated sizes based on the BML data. The image generation module 103 outputs the generated BML image data to the BML image conversion module 107.

The decoder 102 decodes the video data which has been output by the data extraction module 101. In general, the video data is encoded (compressed and encoded). The decoder 102 decodes the encoded video data. The decoder 102 outputs the decoded video data to the 2D-3D conversion module 104.

The 2D-3D conversion module 104 executes 2D to 3D conversion of the decoded video data which has been output by the decoder 102. Specifically, the 2D-3D conversion module 104 estimates depths of pixels included in each of image frames in the video data by analyzing the image frames using the decoded video data. The 2D-3D conversion module 104 estimates the depths of pixels, for example, by using the motion between image frames or the difference between pixel values in the image frame. Based on the estimated depths of pixels, the 2D-3D conversion module 104 generates first left-eye image data and first right-eye image data corresponding to the image frame. The 2D-3D conversion module 104 outputs the generated first left-eye image data and first right-eye image data to the 3D image composite module 109. In addition, the 2D-3D conversion module 104 outputs the estimated depths of the pixels in the image frame to the depth determination module 105.

The depth determination module 105 determines the depth at which the BML image, which has been generated by the BML image generation module 103, is to be displayed using the depth of the pixels in the image frame estimated by the 2D-3D conversion module 104. The depth determination module 105 determines the depth at which the BML image is to be displayed, for example, based on a foremost foreground depth among the depths of the pixels in the image frame. Specifically, the depth determination module 105 firstly detects a foremost pixel in the depth direction (i.e. a most projecting pixel), based on the depths of the pixels in the image frame. Then, the depth determination module 105 determines whether the detected pixel is in front of the depth corresponding to the screen of the display (LCD) 15. If the detected pixel is in front of the depth corresponding to the screen, the depth determination module 105 determines the depth, at which the BML image is to be displayed, to be the depth corresponding to the screen (display plane). On the other hand, if the detected pixel is not in front of the depth corresponding to the screen, the depth determination module 105 determines the depth, at which the BML image is to be displayed, to be the depth corresponding to the detected foremost pixel.

Figure 8:
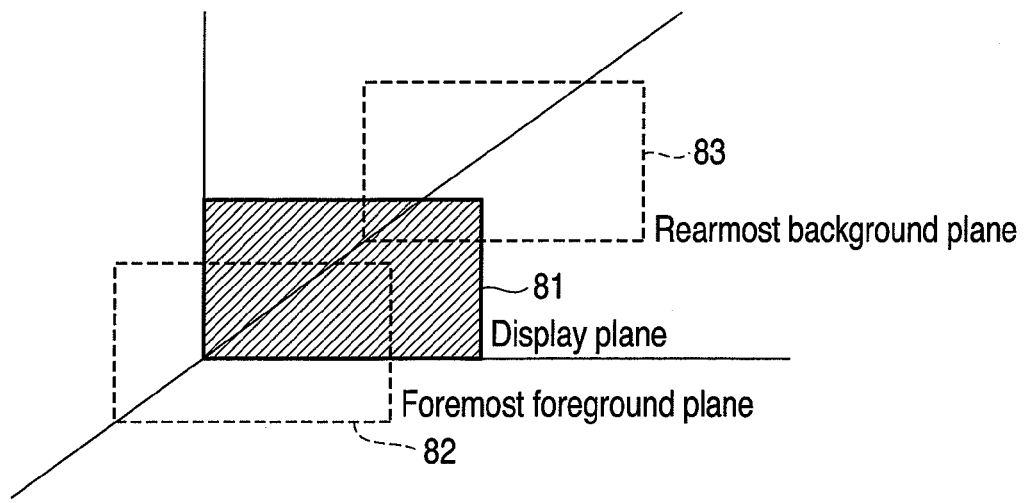
FIG. 8 illustrates an example of a position in a depth direction at which a sub-image is to be displayed, the position being determined by the video reproduction application program which is executed by the electronic apparatus of the embodiment.
Figure 9:
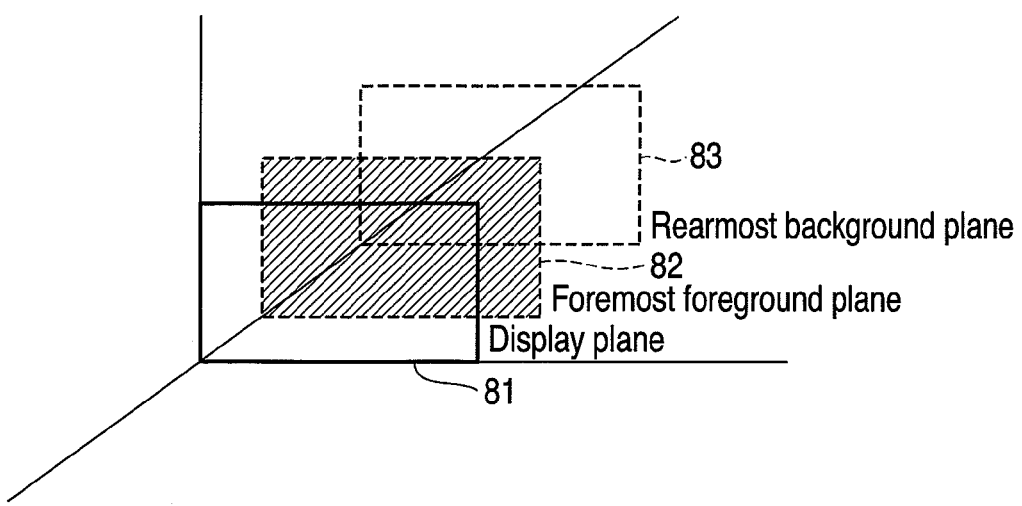
FIG. 9 illustrates another example of the position in the depth direction at which a sub-image is to be displayed, the position being determined by the video reproduction application program which is executed by the electronic apparatus of the embodiment.

Referring to FIG. 8 and FIG. 9, a description is given of an example of the depth determination process by the depth determination module 105. FIG. 8 and FIG. 9 show conceptual views for describing the method of determining the depth at which the BML image (sub-image) is to be displayed. In the example shown in FIG. 8 and FIG. 9, there are shown a display plane 81 representing a depth corresponding to the screen of the LCD 15, a foremost foreground plane 82 representing a depth corresponding to a foremost pixel in the depth direction of all depths of pixels in the image frame, and a rearmost background plane 83 representing a depth corresponding to a rearmost pixel in the depth direction of all depths of pixels in the image frame.

In the example shown in FIG. 8, the foremost foreground plane 82 exists in front of the display plane 81 in the depth direction. Thus, the depth determination module 105 determines the depth, at which the BML image is to be displayed, to be the depth corresponding to the display plane 81.

In the example shown in FIG. 9, the foremost foreground plane 82 exists behind the display plane 81 in the depth direction. Thus, the depth determination module 105 determines the depth, at which the BML image is to be displayed, to be the depth corresponding to the foremost foreground plane 82.

In the meantime, the depth at which the BML image is to be displayed may be designated by the user with use of the user interface, etc. In this case, the user may designate, as the depth at which the BML image is to be displayed, the depth corresponding to the rearmost background plane 83, the depth corresponding to the display plane 81, the depth corresponding to the foremost foreground plane 82, or an arbitrary depth. Furthermore, the computer 1 may change the depth at which the BML image is to be displayed, depending on whether the pointing device 27 receives a manipulation input or not. Specifically, when the pointing device 27 does not receive a manipulation input, the BML image may be displayed, for example, on the rearmost background plane 83, and when the pointing device 27 receives a manipulation input, the BML image may be displayed, for example, on the display plane 81 or foremost foreground plane 82.

Referring back to FIG. 5, the structure of the video content reproduction application 13B is described. If the depth determination module 105 determines the depth at which the BML image is to be displayed, the depth determination module 105 outputs the determined depth to the parallax determination module 106.

Based on the depth which is output by the depth determination module 105, the parallax determination module 106 calculates the parallax (binocular parallax) corresponding to this depth. Specifically, the parallax determination module 106 calculates the parallax between the second left-eye image and second right-eye image for displaying the BML image at the depth determined by the depth determination module 105. The parallax determination module 106 outputs the calculated parallax to the BML image conversion module 107.

The BML image conversion module 107 generates second left-eye image data and second right-eye image data having the parallax that is output by the parallax determination module 106, by using the BML image data which has been output by the BML image generation module 103. In other words, in order to make the user perceive the BML image such that the BML image is displayed at the depth determined by the depth determination module 105, the BML image conversion module 107 generates the second left-eye image data and second right-eye image data having the parallax corresponding to this depth. The BML image conversion module 107 outputs the generated second left-eye image data and second right-eye image data to the 3D image composite module 109.

The UI image generation module 108 generates user interface image data (UI image data) including a menu, etc. for controlling the reproduction of video. The UI image generation module 108 outputs the generated user interface image data to the 3D image composite module 109.

The 3D image composite module 109 generates an image frame which is to be displayed on the screen of the LCD 15, by using the first left-eye image data and first right-eye image data which are output by the 2D-3D conversion module 104, the second left-eye image data and second right-eye image data which are output by the BML image conversion module 107, and the UI image data which is output by the UI image generation module 108. Specifically, the 3D image composite module 109 generates a left-eye image frame which is to be displayed on the screen, by superimposing (i.e. arranging at predetermined positions) the first left-eye image data, second left-eye image data and UI image data. In addition, the 3D image composite module 109 generates a right-eye image frame which is to be displayed on the screen, by superimposing the first right-eye image data, second right-eye image data and UI image data. The 3D image composite module 109 outputs the generated left-eye image frame and right-eye image frame to the display module 110.

The display module 110 displays on the screen of the LCD 15 the image frames which are generated by using the first left-eye image data and first right-eye image data which are output by the 2D-3D conversion module 104, and the second left-eye image data and second right-eye image data which are output by the BML image conversion module 107. Specifically, the display module 110 displays each of the left-eye image frame and right-eye image frame, which are output by the 3D image composite module 109, on the screen (LCD) 15 at a predetermined timing. In the shutter-type 3D video display, the display module 110 alternately displays the left-eye image frame and right-eye image frame on the LCD 15 at a predetermined refresh rate (e.g. 120 Hz). Using the liquid crystal shutter glasses, for example, the user sees the left-eye image frame only by the left eye and sees the right-eye image frame only by the right eye. Thereby, the user can perceive a 3D image (stereoscopic image).

On the other hand, in the polarization-type 3D video display, the display module 110 generates an interleaved image frame in which, for example, the left-eye image frame and right-eye image frame are interleaved in units of a scanning line. The display module 110 displays the generated interleaved image frame on the LCD 15 at a predetermined refresh rate (e.g. 60 Hz). The displayed interleaved image frame is polarized by a polarizing filter which covers the screen of the LCD 15. Specifically the polarizing filter polarizes the left-eye image, which is displayed, for example, in odd-numbered scanning lines on the screen, and the right-eye image, which is displayed in even-numbered scanning lines on the screen, in different directions. By using the polarizing glasses, the user sees the left-eye image only by the left eye and sees the right-eye image only by the right eye. Thereby, the user can perceive the 3D image (stereoscopic image).

By the above-described structure, it is possible to avoid the situation in which the user feels such unnaturalness that a region of the BML image displayed on the screen is embedded in a region of the video. In addition, the user can intuitively manipulate a button, etc. on the BML image by using the pointing device 27. In the above-described structure, the depth at which the BML image is to be displayed is determined by the depth determination module 105. Similarly, as regards an image generated based on data which is not included in the video content data, the depth at which this image is to be displayed may be determined. The image generated based on data which is not included in the video content data is, for instance, a UI image which is generated by the OS 13A or other various application programs. For example, when the depth at which the UI image is to be displayed is determined by the depth determination module 105, left-eye UI image data and right-eye UI image data having the parallax are generated by being calculated the parallax corresponding to this depth. The 3D image composite module 109 generates a left-eye image frame which is to be displayed on the screen, by using the first left-eye image data, second left-eye image data and left-eye UI image data. In addition, the 3D image composite module 109 generates a right-eye image frame which is to be displayed on the screen, by using the first right-eye image data, second right-eye image data and right-eye UI image data. Besides, if an image including the BML image and UI image is regarded as a sub-image, the depth at which this sub-image is to be displayed may be determined by the above-described method.

Next, referring to a flowchart of FIG. 10, an example of the procedure of the video reproduction process is described.

To start with, video content data 51 is input to the data extraction module 101 (block B101). The data extraction module 101 extracts video data and BML data from the video content data 51 (block B102). The data extraction module 101 outputs the video data to the decoder 102. In addition, the data extraction module 101 outputs the BML data to the BML image generation module 103.

Then, the decoder 102 decodes the video data which has been output by the data extraction module 101 (block B103). The decoder 102 outputs the decoded video data to the 2D-3D conversion module 104. The BML image generation module 103 generates BML image data based on the BML data which has been output by the data extraction module 101 (block B104). The BML image generation module 103 outputs the generated BML image data to the BML image conversion module 107. Besides, the UI image generation module 108 generates user interface image data (UI image data) including a menu, etc. for controlling the playback of video (block B105). The UI image generation module 108 outputs the generated UI image data to the 3D image composite module 109.

Using the decoded video data which has been output by the decoder 102, the 2D-3D conversion module 104 estimates depths of pixels included in each of image frames in the video data by analyzing the image frames (block B106). The 2D-3D conversion module 104 generates first left-eye image data and first right-eye image data, based on the estimated depths of pixels in the image frame (block B107). The 2D-3D conversion module 104 generates first left-eye image data and first right-eye image data which have the parallax based on the estimated depths of pixels in the image frame and correspond to this image frame. The 2D-3D conversion module 104 outputs the generated first left-eye image data and first right-eye image data to the 3D image composite module 109. In addition, the 2D-3D conversion module 104 outputs the estimated depths of pixels in the image frame to the depth determination module 105.

Using the depths of pixels in the image frame, which has been estimated by the 2D-3D conversion module 104, the depth determination module 105 determines the depth at which the BML image is to be displayed (block B108). The depth determination module 105 determines (sets) the depth at which the BML image is to be displayed, based on a foremost foreground depth among the depths of pixels in the image frame. The depth determination module 105 outputs the determined depth to the parallax determination module 106. The details of the procedure of the depth determination process for determining the depth, at which the BML image is to be displayed, will be described later with reference to FIG. 11.

Based on the depth which has been output by the depth determination module 105, the parallax determination module 106 calculates the parallax (binocular parallax) corresponding to this depth (block B109). The parallax determination module 106 outputs the calculated parallax to the BML image conversion module 107.

The BML image conversion module 107 generates second left-eye image data and second right-eye image data having the parallax that has been output by the parallax determination module 106, and the BML image data which has been output by the BML image generation module 103 (block B110). Specifically, the BML image conversion module 107 generates second left-eye image data and second right-eye image data which have the parallax based on the determined depth of the BML image (sub-image) and correspond to BML data (additional data). The BML image conversion module 107 outputs the generated second left-eye image data and second right-eye image data to the 3D image composite module 109.

Then, the 3D image composite module 109 generates a left-eye image frame by using the first left-eye image data output by the 2D-3D conversion module 104, the second left-eye image data output by the BML image conversion module 107, and the UI image data output by the UI image generation module 108 (block B111). The 3D image composite module 109 outputs the generated left-eye image frame to the display module 110. The display module 110 displays, on the screen of the LCD 15, the left-eye image frame output by the 3D image composite module 109 (block B112).

The 3D image composite module 109 generates a right-eye image frame by using the first right-eye image data output by the 2D-3D conversion module 104, the second right-eye image data output by the BML image conversion module 107, and the UI image data (block B113). The 3D image composite module 109 outputs the generated right-eye image frame to the display module 110. The display module 110 displays, on the screen of the LCD 15, the right-eye image frame output by the 3D image composite module 109 (block B114).

Then, the 2D-3D conversion module 104 determines whether there is a subsequent image frame that follows the image frame, which is a display target, in the video data (block B115). If there is a subsequent image frame (YES in block B115), the subsequent image frame is set to be the image frame which is a new display target, and the process beginning from block B106 is executed on this image frame. If there is no subsequent image frame (NO in block B115), the video reproduction process is finished.

A flowchart of FIG. 11 illustrates an example of a detailed procedure of the depth determination process illustrated in block B108 in FIG. 10.

To start with, the depth determination module 105 determines whether the depth, at which the BML image (sub-image) is to be displayed, is designated or not (block B21). The depth, at which the BML image (sub-image) is to be displayed, is designated, for example, by the user. If the depth is designated (YES in block B21), the depth determination module 105 determines the depth, at which the BML image is to be displayed, to be the designated depth (block B22).

If the depth is not designated (NO in block B21), the depth determination module 105 detects a foremost pixel in the depth direction (i.e. a most projecting pixel), based on the depths of pixels in the image frame, which has been estimated by the 2D-3D conversion module 104 (block B23). Then, the depth determination module 105 determines whether the depth (depth position) corresponding to the detected pixel is in front of the depth (depth position) corresponding to the screen of the display (LCD) 15 (block B24). In other words, the depth determination module 105 determines whether the depth position corresponding to the detected pixel is forward to the depth position corresponding to the screen plane of the display (LCD).

If the depth of the detected pixel is in front of the depth corresponding to the screen of the display 15 (YES in block B24), the depth determination module 105 determines the depth of the BML image to be the depth corresponding to the screen of the display 15 (block B25).

If the depth of the detected pixel is not in front of the depth corresponding to the screen of the display 15 (NO in block B24), the depth determination module 105 determines the depth of the BML image to be the depth corresponding to the detected pixel (block B26).

By the above-described processes illustrated in the flowcharts of FIG. 10 and FIG. 11, the video content reproduction application 13B can display the video content data, which includes the video data and BML data (additional data), as a proper 3D image. Like the depth corresponding to the BML image, the depth corresponding to the UI image may be determined by using the depth determination process illustrated in the flowchart of FIG. 11. As regards any kind of image that is displayed on the screen, as well as the BML image and UI image, the depth at which the image is to be displayed may be determined by the depth determination process.

In the above description, the depth determination module 105 determines the depth at which the BML image is to be displayed, each time the depth of pixels corresponding to the image frame is estimated. However, for example, the depth may be determined at regular intervals. Further, an optimal depth of a BML image may be determined with respect to a plurality of image frames in video data, which are displayed during a period from the present to a predetermined time point. Since the second left-eye image and second right-eye image having the parallax corresponding to the depth, which is determined as described above, are displayed on the screen, the user can perceive the BML image which is displayed at the determined depth.

As has been described above, according to the present embodiment, video data and data, which is other than the video data, can be displayed as proper 3D video. For example, content data including video data and additional data for displaying a sub-image can be perceived by the user as proper 3D video. When the 3D visualization process has been executed on the video content data including video data and additional data, the user may feel unnaturalness such that a region corresponding to a sub-image is embedded in a region corresponding to video. The 2D-3D conversion module 104 of the embodiment estimates the depths of pixels in the image frame of the video data when the 2D-3D conversion module 104 applies the 2D-3D conversion process to the video data. Then, based on the estimated depths of pixels, the depth determination module 105 determines the depth at which the sub-image is to be displayed. Thus, the sub-image can be displayed at a proper depth in accordance with the video data that is reproduced. Thereby, using the video content data including the video data and additional data, proper 3D video can be displayed.

All the procedures of the video reproduction process in this embodiment may be executed by software. Thus, the same advantageous effects as with the present embodiment can easily be obtained simply by installing a program, which executes the procedures of the video reproduction process, into an ordinary computer through a computer-readable storage medium which stores the program, and executing this program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus configured to reproduce content data comprising video data and sub-image data, the apparatus comprising:
   a first generator configured to:
      estimate depths associated with pixels in an image frame of the video data; and
      generate a first left-eye image data and a first right-eye image data, where the first left-eye image data and the first right-eye image data correspond to the image frame, the first left-eye image data and the first right-eye image data associated with a first parallax, the first parallax based on the estimated depths associated with the pixels;
   an arrangement controller configured to set a depth at which a sub-image is to be displayed to a second depth corresponding to a screen of a display when a first depth, which is a foremost depth among the depths associated with the pixels in the image frame, is in front of the second depth, and to set a depth at which the sub-image is to be displayed to the first depth when the first depth is not in front of the second depth;
   a second generator configured to:
      generate second left-eye image data and second right-eye image data, where the second left-eye image data and the second right-eye image data correspond to sub-image data, the second left-eye image data and the second right-eye image data associated with a second parallax, the second parallax associated with the set depth at which the sub-image is to be displayed; and
   a display controller configured to display, on a screen of a display, an image frame, the image frame generated based on the first left-eye image data, the first right-eye image data, the second left-eye image data, and the second right-eye image data.

2. The electronic apparatus of claim 1, wherein the arrangement controller is further configured to set the depth at which the sub-image is to be displayed each time the depths associated with the pixels in the image frame are estimated.

3. The electronic apparatus of claim 1, wherein the arrangement controller is further configured to set the depth at which the sub-image is to be displayed at regular intervals.

4. The electronic apparatus of claim 1, wherein the display controller is further configured to alternately display an image frame using the first left-eye image data and the second left-eye image data and an image frame using the first right-eye image data and the second right-eye image data.

5. The electronic apparatus of claim 1, wherein the display controller is further configured to display an image comprising a first image frame based on the first left-eye image data and the second left-eye image data and a second image frame based on the first right-eye image data and the second right-eye image data, where the first and second image frames are interleaved in units of a scanning line.

6. The electronic apparatus of claim 1, wherein the arrangement controller is further configured to set the depth, at which the sub-image is to be displayed, to a depth designated by a user.

7. The electronic apparatus of claim 1, wherein the sub-image data comprises data described based on a broadcast markup language.

8. The electronic apparatus of claim 1, wherein the sub-image data comprises data relating to an image for accepting a manipulation input by a user.

9. An image processing method of for reproducing content data comprising video data and sub-image data, the method comprising:

estimating depths associated with pixels in an image frame of the video data by analyzing the image frame;

generating a first left-eye image data and a first right-eye image data, where the first left-eye image data and the first right-eye image data correspond to the image frame video data, the first left-eye image data and the first right-eye image data associated with a first parallax, the first parallax being based on the estimated depths associated with the pixels;

setting a depth at which a sub-image is to be displayed to a second depth corresponding to a screen of a display when a first depth, which is a foremost depth among the depths associated with the pixels in the image frame, is in front of the second depth, and to set a depth at which the sub-image is to be displayed to the first depth when the first depth is not in front of the second depth;

generating second left-eye image data and second right-eye image data, where the second left-eye image data and the second right-eye image data correspond to sub-image data, the second left-eye image data and the second right-eye image data associated with a second parallax, the second parallax associated with the set depth at which the sub-image is to be displayed; and displaying, on a screen of a display, an image frame, the image frame generated based on the first left-eye image data, the first right-eye image data, the second left-eye image data, and the second right-eye image data.

* * * * *